Nov. 14, 1950 I. H. SUDMAN 2,530,096
ELECTRICAL CONTROL APPARATUS
Filed Feb. 27, 1945
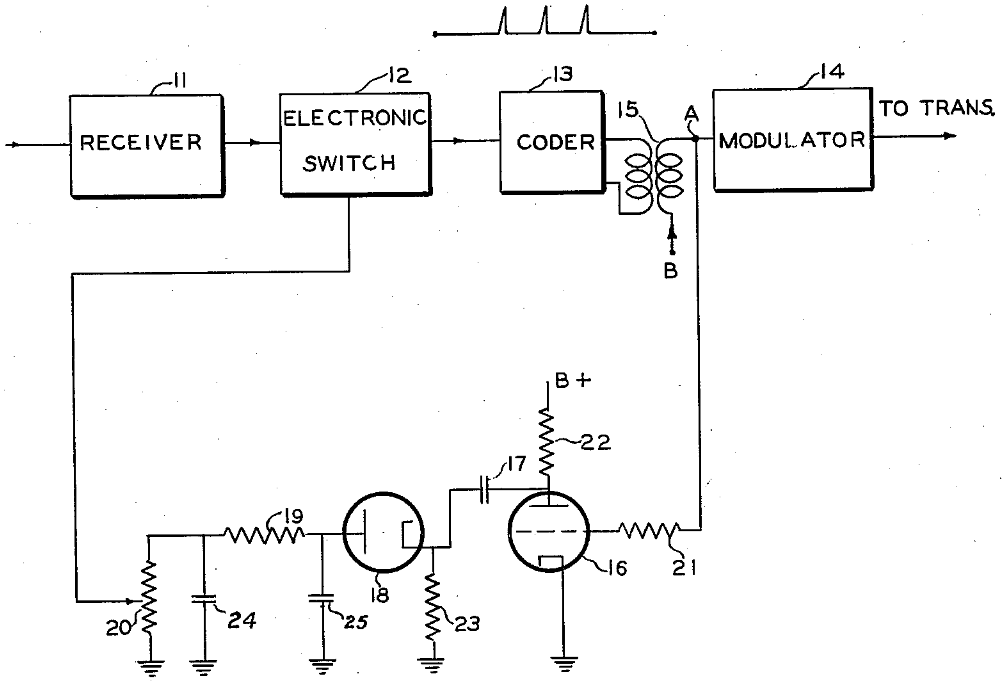
INVENTOR.
ISRAEL H. SUDMAN
BY William D. Hall
Attorney Patented Nov. 14, 1950 2,530,096

UNITED STATES PATENT OFFICE 2,530,096

ELECTRICAL CONTROL APPARATUS

Israel H. Sudman, Cambridge, Mass., assignor, by mesne assignments, to the United States of America as represented by the Secretary of War Application February 27, 1945, Serial No. 580,022

5 Claims. (Cl. 250—2)

This invention relates to radio beacons, and more particularly to types of radio beacons which respond with one or more radio-frequency pulses to interrogating pulse-type transmissions of the same or different radio frequencies. The interrogating pulse is transmitted from an originating source such as an airplane, ship, vehicle, or even a fixed source which can determine its position from the responding pulse.

A typical beacon station includes a receiver whose output consists of a voltage pulse for each pulse of radio waves received. The voltages from the receiver are fed to a coder which responds with a coded output. The coder output may vary in time duration, in number, or both in time duration and number, and thus consists of one or more voltage pulses of the same or different time duration for each received pulse of radio-frequency waves.

One example of a coder is to be found in the copending application of Conrad L. Longmire, Serial Number 566,165, filed December 1, 1944, now abandoned. The coder output is used to actuate a modulator controlling a transmitter. The modulator is of a type which imposes on the radio-frequency generating elements of the transmitter rectangular voltage pulses of substantially fixed magnitude, the duration and number of which are determined by the duration and number of the voltage pulses produced by the coder. The radio-frequency intelligence transmitted by the beacon station then consists of a series of pulses of radio-frequency energy in code. The transmission from the beacon station is intercepted by the originating source and interpreted to obtain the data embodied therein regarding the position of the source relative to the beacon. It is customary to include in the coder an electronic gating device which will prevent the coder from operating in response to an incoming signal during its normal response to a preceding signal, thus preserving the code indications. Nevertheless, a difficulty sometimes encountered is that the response of the coder and beacon may occur at a high repetition rate, thereby causing over-heating of the transmitter or modulator with consequent loss of efficiency or interruption of operation. Usually this difficulty arises when there are a number of interrogating transmissions received from more than one originating source.

One object of this invention is to prevent over-heating of the modulator or transmitter by controlled interruption of the operation of the beacon. This object is accomplished by causing modulation and transmission to cease when the total time of transmission within a period of time normally required for one cycle of operation under excitation by only one interrogating source exceeds a given percentage. In the terminology of the art, this may be described as limiting the duty cycle of the beacon installation.

Other objects and further advantages of the invention will appear more fully herein. A preferred embodiment of the invention is shown in block diagram form in the accompanying drawing. Voltage pulses from the receiver 11 are fed through an electronic switch 12 to the coder 13. The coded pulses are fed from coder 13 to the modulator 14 through a transformer 15. At junction A, between the transformer 15 and modulator 14, part of the coder output is fed to an isolating stage, in this case consisting of the buffer amplifier tube 16. The buffer stage is used to prevent overloading of the coder 13. The output of the buffer stage is fed through a condenser 17 to a detector composed of a resistor 23, a diode 18 and a resistor condenser filter network, composed of resistor 19, potentiometer 20 and condensers 24 and 25. The voltage from the detector is taken from potentiometer 20 and returned to the electronic switch 12.

The average value of the voltage appearing at potentiometer 20 is a function of the duty cycle of the beacon, and is also a function of the time constant of the filter network. As the number of responses of the coder 13 increases, the average value of voltage from the detector appearing at potentiometer 20 will also increase. When the voltage fed from potentiometer 20 passes the value necessary to cut off the electronic switch 12, coder 13 is shut off for a time determined by the time constant of the filter network. The time chosen is such as to allow the circuit elements to cool. The potentiometer 20 allows an adjustment permitting control of the point at which the circuit becomes operative to cut off the electronic switch 12. Bias for the isolating stage may be supplied at B through the secondary of the transformer 15. Resistor 21 is provided merely for current limiting, and resistor 22 is a suitable plate load for tube 16.

In a typical operation, when only one interrogating source transmits, the beacon will respond normally. When two or more interrogating sources transmit, the beacon may respond intermittently because of the operation of the novel duty cycle limiter disclosed herein, the duration of the response periods and the time intervals between them depending on design considerations, the number of interrogations and the setting of the equipment.

Many variations of the circuit disclosed will be apparent to those skilled in the art. As examples, the isolating tube 16 may be a cathode follower; or signals may be fed directly to condenser 17 if proper values of circuit constants are chosen to supply a high impedance parallel to the output of coder 13; or a direct current amplifier may be used between the potentiometer 20 and the electronic switch 12. Therefore, the application is not restricted to the exact form of the invention herein disclosed.

What is claimed is:

1. A radio beacon system including a receiver, a transmitter, coding means responsive to the output of said receiver for producing at least one pulse for each received signal for modulating said transmitter, and means responsive to said coding means for limiting the duty cycle of said beacon comprising an integrating network, a rectifier interposed between said coding means and said integrating network for unidirectionally charging said network and means for applying the output voltage of said integrating network to cut-off said beacon, when said voltage reaches a predetermined level.

2. A radio beacon system including a receiver, a transmitter, coding means responsive to the output of said receiver for producing at least one pulse for each received signal for modulating said transmitter, and means responsive to said coding means for limiting the duty cycle of said beacon comprising an integrating circuit and a rectifier interposed between said coding means and said integrating circuit for unidirectionally charging said network and means for applying the output voltage of said integrating network to render said beacon inoperative in response to pulses from said coding means having a total duration in excess of a predetermined portion of a given period of time.

3. A radio beacon system comprising a receiver, a transmitter, an electronic coding device responsive to the output of said receiver and effective to produce at least one electrical impulse for each signal from said receiver for modulating said transmitter, a rectifying device conductive in response to the electrical impulses from said coding device, a parallel resistor-condenser combination coupled to said rectifying device, means coupled to said resistor-condenser combination for disconnecting said receiver from said coding device in response to pulses from said coding device having a total duration in excess of a predetermined portion of a given period of time.

4. A radio beacon comprising a receiver, a transmitter, coding means coupled to the output of said receiver and effective to produce at least one pulse for each signal from said receiver for modulating said transmitter, an integrating network coupled to said coding means and having a time constant effective to produce a voltage proportional to the amplitude of the pulses from said coding means and the duration thereof in a predetermined period of time, and means for applying the voltage from said integrating network to cut-off said transmitter in response to a voltage from said integrating network in excess of a predetermined value, whereby overheating of said transmitter is automatically prevented.

5. A radio beacon comprising a receiver having an electronic switch, a transmitter, an electronic coding means coupled to the output of said receiver and effective to produce at least one electrical impulse for each signal from said receiver for modulating said transmitter, an isolating device coupled to said coding means, a rectifying device coupled to said isolating device and having a time constant circuit effective to produce a voltage proportional to the amplitude of the pulses from said coding means and the duration thereof in a predetermined period of time, and adjustable means coupling said rectifying device to said switch of said receiver to cut-off said transmitter in response to a voltage across said time constant circuit in excess of an adjustable predetermined value, whereby heating of said transmitter above an adjustable amount is automatically prevented.

ISRAEL H. SUDMAN.

REFERENCES CITED

The following references are of record in the file of this patent:

UNITED STATES PATENTS

| Number | Name | Date |
|---|---|---|
| 1,475,632 | Herty | Nov. 27, 1923 |
| 2,141,343 | Campbell | Dec. 27, 1938 |
| 2,202,432 | Santucci | May 28, 1940 |
| 2,250,202 | Matusita | July 22, 1941 |
| 2,295,297 | Schneider | Sept. 8, 1942 |
| 2,334,530 | Andrews | Nov. 16, 1943 |